United States Patent Office 2,795,108
Patented June 11, 1957

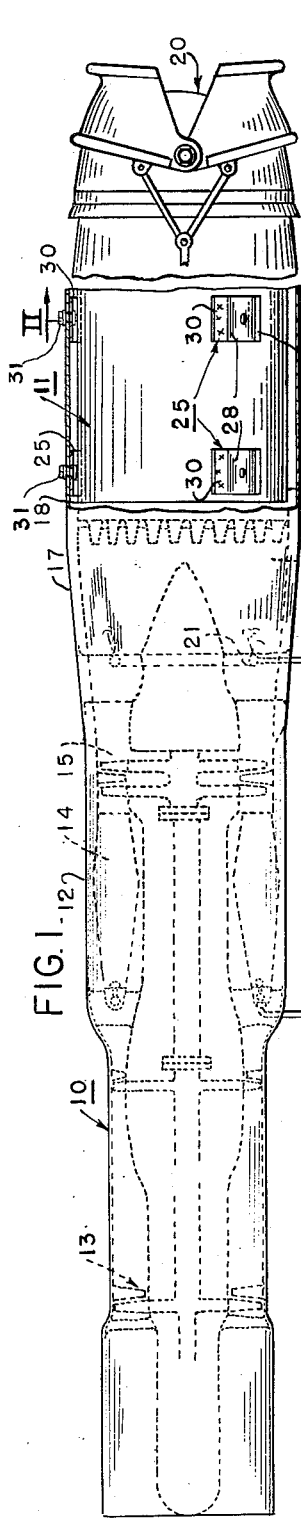

2,795,108

COMBUSTION APPARATUS

Harvey B. Saldin, Prairie Village, Mo., assignor to Westinghouse Electric Corporation, East Pittsburgh, Pa., a corporation of Pennsylvania Application October 7, 1953, Serial No. 384,631

3 Claims. (Cl. 60—39.31)

This invention relates to combustion apparatus, and more particularly to afterburner structure for an aviation gas turbine power plant.

In the construction of sheet metal combustion apparatus, such as the afterburner of an aviation turbojet engine, it is desirable to provide a combustion chamber shell or liner which must be supported and spaced concentrically from the outer casing. Several methods have already been utilized for supporting a combustion chamber liner, sometimes called a "squeal baffle," in a turbojet afterburner apparatus, but those that provided sufficient rigidity to prevent displacement or development of eccentricity of the liner, have failed to allow for normal thermal expansion of the afterburner structure. It is an object of the invention to provide an improved afterburner and liner support structure which is adapted to maintain concentricity of the usual liner while permitting differential expansion thereof, in both radial and axial directions, without development of undersirable stress concentrations.

Another object of the invention is the provision of improved yieldable support means for the cylindrical liner of a combustion apparatus, which is adapted to ensure concentricity of the liner regardless of differential expansion, by elastic deformation of the support means.

A further object of the invention is to provide an improved afterburner structure having a conventional liner and novel, elastically deformable support means therefor, which is readily adapted to be employed with gas turbine power plants of existing design.

These and other objects are effected by the invention as will be apparent from the following description taken in connection with the accompanying drawings, forming a part of this application, in which:

Fig. 1 is a longitudinal diagrammatic view, partly in section, of a typical turbojet power plant having an afterburner constructed in accordance with the invention;

Fig. 2 is an enlarged detail, sectional view of the power plant, along the line II—II of Fig. 1; and Fig. 3 is an enlarged detail, fragmentary perspective view of one of the improved support elements shown in Figs. 1 and 2.

Referring to Fig. 1 of the drawing, the illustrated aviation turbojet power plant comprises a gas turbine engine 10 and an afterburner 11. The gas turbine engine 10 has a generally cylindrical outer casing 12 in which the usual components are coaxially mounted, including an axial-flow compressor 13, combustion apparatus 14 and a turbine 15 for driving the compressor. The afterburner 11 comprises a generally cylindrical outer shell 17 coaxially secured to the engine casing 12, and a concentric combustion chamber liner 18 which is mounted in spaced relation in the outer shell for defining a combustion chamber 19, which communicates with a variable area nozzle 20. Suitable afterburner fuel supply apparatus 21 is supported by the afterburner shell 17 and extends into the combustion chamber 19. It will be understood that, in operation, air under pressure is supplied by the compressor 13 for supporting combustion of fuel suitably metered to the combustion apparatus 14, the resultant hot motive gases and residuary air under pressure being then expanded through the turbine 15 and exhausted into the afterburner combustion chamber 19. Additional fuel supplied by way of the apparatus 21 is then burned in the exhaust gases to augment the thrust at the nozzle 20.

According to the invention, the liner 18 is supported from the outer shell 17 of the afterburner 11 through the medium of a plurality of yieldable support members 25. The support members 25 may be arranged in axially spaced groups, each group consisting of three or more members circumferentially spaced in the space or annulus 18a between the shell 17 and liner 18, as best shown in Fig. 2. Referring to Fig. 3 of the drawing, each support member 25 is preferably folded from an integral strip of sheet metal, such as stainless steel, and comprises a central arcuate web portion 26, which is adapted to engage the outer shell 17, outwardly disposed complementary corrugations or loop portions 28 extending from opposite sides of the web portion, and similar inwardly extending corrugations or retrorse loop portions 29 disposed adjacent and partially underlying the outer loop portions and terminating in oppositely extending flange portions 30, which are adapted to be welded or otherwise suitably secured to the outer surface of the liner 18. One or more fastening devices, such as bolts 31, are provided for securing each web portion 26 to the outer shell 17 of the afterburner. The axes of the loop portions are substantially parallel to the liner axis. It will be noted that the inwardly disposed loop portions 29 are spaced apart to form a central clearance 35. Clearances 36 normally are provided between the web portion 26 and adjacent surfaces of the loop portions 29. Similarly, the loop portions 28 are normally spaced by clearances 37 from the respective flange portions 30. By means of these clearances the support elements 25 are adapted to allow for radial differential expansion of the associated elements of the afterburner assembly, while the oppositely disposed loop portions of each support element are adapted to maintain concentricity of the liner relative to the outer shell.

In combination with the afterburner shown in Fig. 1, the several support elements 25 are adapted to cooperate to permit differential thermal expansion of the structure, both radial and axial, through elastic deformation of the supporting components and with minimum stressing of the liner or outer shell. Owing to the balanced arrangement of the oppositely disposed corrugations or loop portions 28 and 29, each of the support elements 25 is adapted to yield in a radial direction while resisting any tendency toward rotary displacement of the liner structure. At the same time, excessive displacement in a radial direction would be substantially limited upon engagement of the loop portions 28 with the adjacent flange portions 30, or upon engagement of the loop portions 29 with the web portion 26.

While the invention has been shown in but one form, it will be obvious to those skilled in the art that it is not so limited, but is susceptible of various changes and modifications without departing from the spirit thereof.

What is claimed is:

1. Combustion apparatus for a power plant motivated by hot fluid under pressure, comprising substantially cylindrical outer shell structure, a substantially cylindrical combustion chamber liner of smaller diameter disposed coaxially within said shell structure, said shell and liner structures forming an annular space therebetween, and a plurality of yieldable support elements interposed in said annular space for holding said liner structure in concentric relation with respect to said outer shell structure, each of said support elements comprising an integral strip of sheet metal forming a central web portion secured to said outer shell structure, spaced complementary loop portions extending from opposite sides of said web portion with the axes of said loop portions aligned parallel to the shell axis, and oppositely disposed flange portions extending from said loop portions and secured to said liner structure, each of said loop portions having surfaces similarly spaced in a radial direction from adjacent surfaces of the element to facilitate uniform distortion thereof during differential thermal expansion of said liner and shell sstructure.

2. Combustion apparatus for a power plant motivated by hot fluid under pressure, comprising substantially cylindrical outer shell structure, a substantially cylindrical combustion chamber liner of smaller diameter disposed coaxially within said shell structure, said shell and liner structures forming an annular space therebetween, and a plurality of yieldable support elements interposed in said annular space for holding said liner structure in concentric relation with respect to said outer shell structure, each of said support elements comprising an oppositely corrugated integral strip of sheet metal having a central web portion secured to said outer shell, outwardly disposed complementary loop portions extending from opposite sides of said web portion, inwardly disposed complementary loop portions extending from and partially underlying said outer loop portions and terminal flange portions extending in opposite directions from the last-mentioned loop portions and secured to said liner structure, all adjacent surfaces of said integral strip being normally spaced apart to facilitate uniform distortion thereof consequent to differential thermal expansion of said liner and shell structures.

3. Apparatus for conveying hot fluid under pressure comprising tubular outer structure, an inner tubular structure of substantially similar cross-sectional shape as said outer tubular structure and disposed coaxially within said outer tubular structure, said inner and outer tubular structures forming an annular space therebetween, and a plurality of yieldable support elements interposed in said annular space for holding said inner tubular structure in concentric relation with respect to said outer tubular structure, each of said support elements comprising an integral strip of sheet metal forming a central web portion abutting one of said inner and outer tubular structures, spaced complementary loop portions extending from opposite sides of said web portion with the axes of said loop portions aligned parallel to the axis of said outer tubular structure, and oppositely disposed flange portions extending from said loop portions and attached to the other of said inner and outer tubular structures, each of said loop portions having surfaces similarly spaced in a radial direction from adjacent surfaces of the element to facilitate distortion thereof during differential thermal expansion of said inner and outer tubular structures.

References Cited in the file of this patent

UNITED STATES PATENTS

| | | |
|---|---|---|
| 268,860 | Browell | Dec. 12, 1882 |
| 499,854 | Schaffer | June 20, 1893 |
| 527,734 | Spindler | Oct. 16, 1894 |
| 1,399,503 | McRae | Dec. 6, 1921 |
| 2,506,611 | Neal et al. | May 9, 1950 |
| 2,510,645 | McMahan | June 6, 1950 |
| 2,605,611 | Wosika | Aug. 5, 1952 |
| 2,707,493 | Bonvillian et al. | May 3, 1955 |